July 7, 1942.  T. M. PIERCE, JR  2,288,596
AIR COMPRESSOR
Filed Aug. 7, 1939
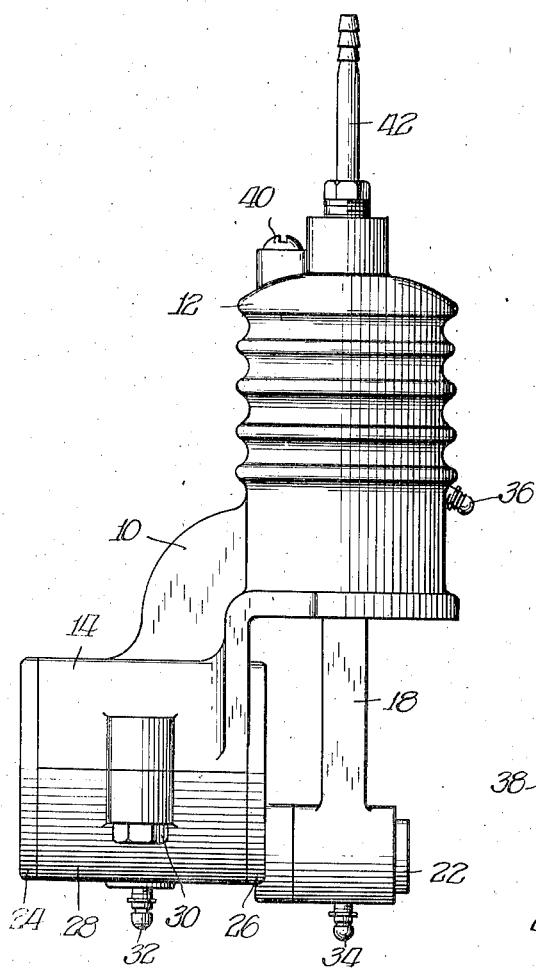
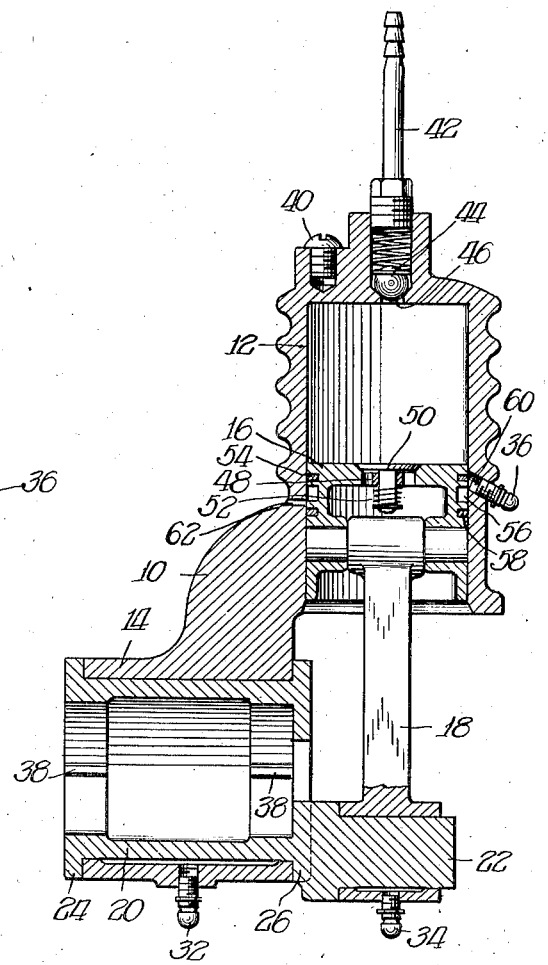
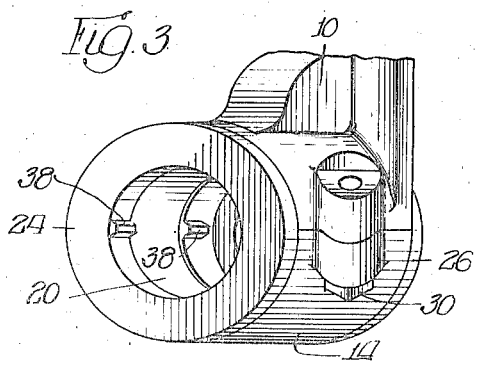
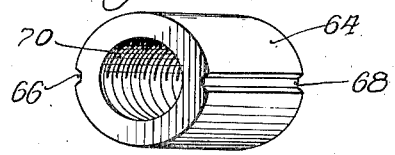
INVENTOR.
Thomas M. Pierce, Jr.,
BY
ATTORNEY.

Patented July 7, 1942

2,288,596

UNITED STATES PATENT OFFICE 2,288,596

AIR COMPRESSOR

Thomas M. Pierce, Jr., St. Louis, Mo., assignor to David E. Owen, St. Louis, Mo.

Application August 7, 1939, Serial No. 288,746

6 Claims. (Cl. 230—39)

This invention relates to improvements in air compressors, and more particularly to a demountable air compressor for connection with the power take-off of an internal combustion engine.

The need for a demountable air compressor to be driven by a tractor or other engine has become great since the introduction of pneumatic tires as standard equipment for tractors, trucks, and the like. In the case of tractors used on farms, the desirable practice of varying the pressure in the tire in accordance with variations in the firmness of the soil over which the tractor will be driven can only be followed where a power air compressor is available. For example, where the ground is hard, a high pressure will be maintained in the tires, but where the ground is soft, a low pressure will be utilized. Inasmuch as the condition of the ground will vary directly with the amount of rain and the like, farmers are obliged to change the pressures in their tractor tires frequently, and this coupled with the size of tires and the pressure carried makes the employment of a power compressor imperative.

Moreover, in order to obtain additional traction under certain conditions, there frequently is injected into the tires water which adds weight. In the winter time in order to avoid freezing, an anti-freeze compound is used. Here, again, power equipment is required.

In addition to the problem of inflating tires, the farmer has many other uses for air compression equipment. Whereas twenty-five years ago farmers sprayed their fruit trees or potato plants with manually operated apparatus, or used hand spray guns to disinfect a chicken house or stalls in a barn, or applied paint to their farm buildings by means of a brush, the tendency today is to do all of these things by utilizing compressed air, either for the reason that the work is much better done, or because the work is much more quickly done.

While the above uses for an air compressor demountably associated with a tractor power take-off have been identified as practices of farmers, they are used in many other places where tractors, trucks and other equipment having pneumatic tires are used. For example, in motorized units of the army there is a great demand for air compressors which may be readily coupled to an internal combustion engine. The same is true in many types of construction work, such as road construction.

With these general conditions in mind, the general object of this invention is to provide an air compressor which may be readily adapted to the power take-off of a majority of the makes of tractors now on the market. The power take-off of most tractor engines is a stub shaft, frequently an extension of the main crank shaft, projecting toward the rear of the tractor and having a splined or threaded end or some other means of effecting a coupling to a shaft to be driven. Certain farm implements require power and the power is furnished to these implements by making a coupling to this power take-off. The proposal of this invention is to provide a new and novel air compressor for mounting on this power take-off.

A specific object of this invention is to provide an improved type of demountable air compressor having a simple and rugged construction. Equipment used on a farm is invariably subjected to hard use, due not only to the fact that most farm work is of the heavy type, but also to the failure of the average farmer to take care of his equipment. One of the features of this invention is the provision of an L-shaped casting or block which may be shaped to receive both the piston and a single journal on the crank shaft which drives the piston. This journal is mounted in a main bearing which alone provides all of the positioning for the crank shaft. By providing a single L-shaped casting for holding in operable relationship the moving parts of this air compressor, a simple structure for effecting a firm connection with the source of power is provided. Moreover, the fittings necessary to mount the moving parts in the housing are so simple that the taking apart of the compressor by the ordinary farmer will not result in an array of parts which would cause confusion in reassembling.

A further object of this invention is to provide a novel coupling between the power take-off of the internal combustion engine and the crank shaft of the air compressor. In this invention, the crank shaft, which is in reality a journal, is hollowed and inserted over the power take-off, with the result that a chain or cable anchored to some fixed point on the tractor frame and fastened to the piston end of the compressor block or casting to prevent it from rotating, will be sufficient to keep the air compressor from working its way off the take-off. Expressed somewhat differently, the purpose of this construction is to move the crank shaft bearing as far as possible over a splined connection on the take-off so that the crank shaft bearing and the splined take-off have a common axis. This virtually eliminates the tendency of the splined take-off to thrust the air compressor outwardly toward disengagement. The net accomplishment of this arrangement is that the power take-off constitutes the sole necessary support for the air compressor and a cable or chain providing just sufficient strength to prevent the air compressor from rotating on the power take-off is sufficient to hold the air compressor in assembled relationship with the internal combustion engine.

Another object of this invention arises from the need of maintaining a broad market for this air compressor. Expressed differently, it is desirable that some sort of an adaptor be provided for enabling a user to couple the air compressor to the power take-off of any make of tractor. As indicated above, these power take-offs, while generally having splined ends, sometimes have threads and even lugs. One of the features of this invention is the provision of a sleeve adaptor which has a demountable fitting for the air compressor and a specific fitting for a given power take-off. For example, one sleeve adaptor will have a threaded fitting to receive a threaded shaft, while another may have a multiple series of grooves to receive a multiple splined shaft. The thickness of the sleeve adaptors will be varied in order to meet different diameters of the power take-off shaft. By this construction, the air compressor may, by use of a particular sleeve adaptor, be mounted on any power take-off. These sleeve adaptors are very inexpensive to manufacture.

A further object of this invention is to provide satisfactory lubrication, and toward this end, a plurality of ball lubricant fittings have been utilized. The piston is provided with a lubricant bearing groove for storing lubricant, and the piston wall carries a sludge port to permit escape of waste lubricant.

These and such other objects as may hereinafter appear are obtained by the embodiment shown in the drawing comprising one sheet, wherein:

Figure 1 is a view in elevation of the device;

Figure 2 is a view in cross section of the device;

Figure 3 is a perspective view of the sleeve journal or crank shaft; and

Figure 4 is a perspective view of an adaptor sleeve.

One embodiment of this invention may be seen in the drawing wherein the numeral 10 identifies an L-shaped casting or block having a cylinder 12 cut into one arm of the L and a half bearing 14 cut into the other arm in such a fashion that the axis of the cylinder will intersect at right angles the axis of the half bearing. While the embodiment shown in the drawing discloses a half bearing 14, this arrangement as will appear hereinafter, is made for construction purposes only. The concept lies in mounting the air compression chamber or cylinder at right angles to a single bearing which will carry without additional support a crank shaft to drive a piston reciprocable in the cylinder, and it is apparent that a complete bearing might be substituted in the L-shaped block 10 in place of the half bearing 14.

Continuing to refer to the drawing, the major moving parts of the compressor number three. They are a piston 16, a connecting rod 18 which is conventionally coupled to the piston, and a crank shaft 20 which, because its consists essentially of a sleeve journal will be referred to as a sleeve journal, as this term has more significance for the purposes of this invention. In one side of the sleeve journal 20 and at a point outside its axis is a driving pin 22 upon which is journaled the connecting rod 18 by any conventional means. The sleeve journal 20 possesses two side flanges 24 and 26. The half bearing 14 is completed by a bearing cap 28 which is drawn up by any suitable means such as bolts 30.

The numerals 32, 34 and 36 identify lubricant fittings of the ball head type through which may be forced a lubricant to the sleeve journal 20, the driving pin 22 and the piston 16 respectively. As has been mentioned above, the sleeve journal 20 is hollow throughout the whole of its length with the exception of the portion next to the side flange 26, at which point the sleeve journal casting is solid almost to its axis in order to provide sufficient structural strength to support the driving pin 22. Interiorally of the sleeve journal 20, as may be seen in Figures 2 and 3, are inwardly directed lugs 38 which will engage the grooves of a spline on a power take-off of an internal combustion engine not shown.

The value of this sleeve journal which may be inserted throughout its length over the splined end of the power take-off lies in the fact that no rocking movement or force will be generated in the sleeve journal or its supporting bearing which does not exist to the same extent in that portion of the drive take-off which lies within the bearing. Perhaps the thought may better be conveyed by saying that the net result of this construction is that the entire compression pump may be slipped onto the drive take-off and no outward thrust between the power take-off and the air compressor unit be generated. The result of this is that a cap screw 40 which may be seen seated in the cylinder end of the L-shaped block may be utilized as an anchor for a cable or chain fastened to any fixed portion on the source of power, which ordinarily is an internal combustion engine. The air compressor will operate satisfactorily without additional holding means.

It will be observed that the side flanges 24 and 26 on the sleeve journal 20 provide the means for holding the sleeve journal 20 in fixed axial position.

Completing the description of the specific embodiment shown, the cylinder 12 is exhausted through outlet port 42 in which is mounted a conventional spring and ball check 44 which prevents backing up of air down the outlet port 46. The outlet line (not shown) consists of a hose of any suitable material which will have some sort of a universal coupling to facilitate use of the pump for different applications such as sprayers, tires and the like.

The inlet to the cylinder 12 is provided by the inlet port 48 formed centrally of the piston 16 and is closed by a valve 50 urged into closed position by a spring 52. The piston carries three grooves 54, 56 and 58, there being a compression cylinder ring in the upper and lower grooves 54 and 58 respectively. The middle groove 56 is designed to act as an oil or grease reservoir, and in order that oil or grease or other lubricants may be added from time to time, the wall of the cylinder 12 is perforated by a hole 60 which registers with the groove 56 when the piston is in its lowermost position, which is shown in Figure 2 of the drawing. The lubricant fitting 36 gives admittance to the groove 56. The numeral 60 identifies a sludge port or a bleeder which will permit escape of old or excess lubricant at any time.

In Figure 4 is shown an adaptor sleeve 64 having grooves 66 and 68 in its exterior wall. These grooves are so positioned that they are complementary to the lugs 38 in the sleeve journal 20. This adaptor sleeve may have internal threads 70 to permit the adaptation of the air compressor to a power take-off having a threaded end. Or the sleeve adaptor 64 may have other types of internal lugs to engage specific lug arrangements on a particular power take-off. The sleeve journal 64 performs two functions, namely, that of adapting the sleeve journal 24 to shafts having a smaller diameter than the inside diameter of the sleeve journal 24, and secondly, the function of utilizing different types of splines on power take-offs. A sleeve adaptor of the type shown in Figure 4 is very inexpensive and has the distinct merit of making it possible to utilize this air compressor on a wide range of power take-offs.

Having described the parts of the embodiment of this invention shown in the drawings, a few words will be devoted to describing the operation. The air compressor is coupled to the power take-off of the internal combustion engine, such as that on the ordinary farm tractor, by slipping the sleeve journal 20 over the splined end of the power take-off, and then fastening the cap screw 40 to a cable or other holding means anchored to some fixed point on the tractor. When the engine starts, the entire air compressor is rotated in the direction of rotation of the splined power take-off until the cable or other means fastened to the cap screw 40 is drawn taut, at which time the sleeve journal 20 commences to rotate. This rotation causes a reciprocation of the connecting rod 18 and of the piston 16.

On the compression stroke, the piston forces the air within the cylinder through the outlet port 46 past the spring and ball check 44. On the return stroke, the difference in pressures between the outlet line 42 and the interior of the cylinder 12 firmly seats the ball check 44. As the piston moves downwardly, it tends to reduce the pressure on the inside of the cylinder whereupon air under atmospheric pressure enters the cylinder through the valve 50.

The machine is readily lubricated by utilizing the fittings 32, 34 and 36. It is apparent that the compressor may be taken apart and its three moving parts reassembled in a minimum amount of time. The construction is very rugged and no frail portion is so positioned that dropping could damage the major moving parts of the compressor.

While the invention has been described in terms of the embodiment shown in the drawing, the scope of the invention should not be restricted to that embodiment. For example, one important feature of the invention is the employment of the L-shaped block which carries a single main bearing. This conception would include a complete bearing as well as the partial bearing shown in the drawing. Also, the invention calls for a hollow or sleeve journal to perform the functions of a crank shaft in order that end-to-end coupling of the power take-off and the drive shaft of the air compressor might be avoided, together with all the incidental difficulties arising from such a coupling.

The new and useful result obtained by the sleeve journal in this case is that it constitutes the sole journal for the air compressor crank shaft, and with its main bearing the sole means for maintaining that crank shaft in right angle relationship with the axis of the piston and cylinder. This double function is partly assisted by the L-shaped casting or block 10. The sleeve journal 20, once having the specified relationship to the axis of the cylinder 12, performs the dual function of completely centering the entire air compressor assembly upon the drive take-off of the internal combustion engine, and also serves to keep both that drive take-off and itself in right angle relationship with the piston.

Having thus described my invention what I claim as new and desire to secure by Letters Patent of the United States, is:

1. An air compressor of the character described comprising, in combination, an L-shaped casting, one arm of the L-shaped casting forming the end and side wall of a compression chamber, a bearing member in the other arm, a piston reciprocable in the compression chamber, and means mounted in said bearing member for actuating said piston, said means comprising a sleeve journal positioned inside the bearing and coupled to a connecting rod for driving the piston and having on its inward wall means for engaging external splines on a driving shaft.

2. An air compressor of the character described comprising, in combination, an L-shaped casting, one arm of the L-shaped casting forming the end and side wall of a compression chamber, a bearing member in the other arm, a piston reciprocable in the compression chamber, and means mounted in said bearing member for actuating said piston, said means comprising a sleeve journal drilled throughout that portion of its length adjacent to points of contact with the bearing member and coupled to a connecting rod for driving the piston, whereby said sleeve journal may be mounted on a power take-off of an engine without additional coupling means.

3. An air compressor of the character described comprising, in combination, an L-shaped casting, a compression chamber in one arm of the L-shaped casting, a bearing member in the other arm, a piston reciprocable in the compression chamber, and means mounted in said bearing member for actuating said piston, said means comprising a sleeve journal coupled to a connecting rod attached to the piston, said sleeve journal having flanges to engage the side walls of the bearing member.

4. An air compressor of the character described comprising, in combination, an L-shaped casting, a compression chamber in one arm of the L-shaped casting, a half bearing in the other arm, a sleeve journal positioned in said half bearing and having mounted thereon eccentrically of its axis a journal coupled to a connecting rod attached to the piston, and a bearing cap for maintaining the sleeve journal in firm position in the half bearing.

5. An air compressor of the character described, comprising, in combination, an L-shaped casting, a compression chamber in one arm of the L-shaped casting, a piston carrying an inlet valve reciprocable in said compression chamber, a groove for carrying lubricating material in the exterior wall of said piston, a lubricant charging means mounted in the wall of the compression chamber at a point where contact with said groove may be made when the piston is at the beginning of a compression stroke, a half bearing in the other arm of the L-shaped casting, a sleeve journal in said half bearing and having flanges for maintaining axial positioning, a driving journal mounted on said sleeve journal and coupled to a connecting rod fastened to said piston, a bearing cap for holding the sleeve journal in firm position, and lugs on the inner surface of said sleeve journal for engaging driving means mounted on a power take-off of an internal combustion engine.

6. In combination with the power take-off of an engine, an air compressor having a sleeve journal driving member, and a readily removable intermediate means adapted to engage simultaneously the sleeve journal driving member and the power take-off to effect a driving connection therebetween, said intermediate means comprising a sleeve member which may be inserted within the sleeve journal driving member and over the power take-off.

THOMAS M. PIERCE, JR.

DISCLAIMER 2,288,596.—*Thomas M. Pierce, Jr.*, St. Louis, Mo. AIR COMPRESSOR. Patent dated July 7, 1942. Disclaimer filed Dec. 27, 1945, by the assignee, *David E. Owen*.
Hereby enters this disclaimer to claims 1, 2, 3, and 4 of said patent.
[*Official Gazette February 12, 1946.*]